US011544959B2

(12) United States Patent
Blanchon

(10) Patent No.: US 11,544,959 B2
(45) Date of Patent: Jan. 3, 2023

(54) SYSTEM FOR ACQUIRING DIGITAL FINGERPRINTS EQUIPPED WITH AN IMPROVED DEVICE FOR ADDRESSING LINES

(71) Applicant: ISORG, Limoges (FR)

(72) Inventor: David Blanchon, Grenoble (FR)

(73) Assignee: ISORG, Limoges (FR)

( * ) Notice: Subject to any disclaimer, the term of this patent is extended or adjusted under 35 U.S.C. 154(b) by 0 days.

(21) Appl. No.: 17/426,766

(22) PCT Filed: Feb. 6, 2020

(86) PCT No.: PCT/EP2020/053019
§ 371 (c)(1),
(2) Date: Jul. 29, 2021

(87) PCT Pub. No.: WO2020/165023
PCT Pub. Date: Aug. 20, 2020

(65) Prior Publication Data
US 2022/0101648 A1 Mar. 31, 2022

(30) Foreign Application Priority Data
Feb. 11, 2019 (FR) .................... 1901324

(51) Int. Cl.
*G06V 40/13* (2022.01)
*G06V 40/12* (2022.01)
*G06F 3/041* (2006.01)

(52) U.S. Cl.
CPC ...... *G06V 40/1347* (2022.01); *G06V 40/1306* (2022.01); *G06F 3/04166* (2019.05)

(58) Field of Classification Search
CPC ...................................... G06V 40/13
See application file for complete search history.

(56) References Cited

U.S. PATENT DOCUMENTS

| 2017/0336894 | A1 | 11/2017 | Nelson et al. |
| 2019/0088184 | A1* | 3/2019 | Morein ............... G06F 3/04166 |
| 2020/0118509 | A1* | 4/2020 | Noh ....................... G11C 19/28 |
| 2020/0364437 | A1* | 11/2020 | Wang ................. G06V 40/1306 |

FOREIGN PATENT DOCUMENTS

| EP | 0 586 398 A1 | 3/1994 |
| FR | 2 975 213 A1 | 11/2012 |

* cited by examiner

*Primary Examiner* — Joseph R Haley
(74) *Attorney, Agent, or Firm* — Kaplan Breyer Schwarz, LLP

(57) ABSTRACT

A fingerprint recognition system, includes a touch surface configured so as to provide location information for at least one contact point (PCO) of a finger having a fingerprint in contact with the touch surface, wherein the system comprises: a TFT panel, arranged underneath the touch surface, comprising a detection array comprising M rows at least some of which comprise detection cells for detecting an image representative of the fingerprint, a row-addressing system being integrated into the array, and configured so as to activate, row after row, the detection cells of a corresponding row in a scanning direction of the rows, a calculation device, configured so as to receive the location information and so as to command the addressing system to address the array starting from an address range (ZA) grouping together a subset of rows from among the M rows of the array, and determined on the basis of the location information.

8 Claims, 4 Drawing Sheets

SYSTEM FOR ACQUIRING DIGITAL FINGERPRINTS EQUIPPED WITH AN IMPROVED DEVICE FOR ADDRESSING LINES

CROSS-REFERENCE TO RELATED APPLICATIONS

This application is a National Stage of International patent application PCT/EP2020/053019, filed on Feb. 6, 2020, which claims priority to foreign French patent application No. FR 1901324, filed on Feb. 11, 2019, the disclosures of which are incorporated by reference in their entirety.

FIELD OF THE INVENTION

The invention relates to a fingerprint acquisition system equipped with an improved row-addressing device. It is applied notably for image sensors, arranged for example underneath touchscreens, in order to identify a user by recognizing his fingerprints, at any location on the screen.

BACKGROUND

Detection arrays used in what are known as TFT panels are, as is known, formed of detection cells $P(i,j)$, also called pixels, that are arranged in rows and in columns. FIG. 1 illustrates such an arrangement. By convention, it is noted that the detection cell $P(i,j)$ is situated on the row $L(i)$ and on the column $Col(j)$. Each detection cell $P(i,j)$ consists of a light sensor $D(i,j)$, generally a photodiode, that generates charge in proportion to the received light energy and stores said charge in its capacitor, and a thin-film transistor $T(i,j)$ whose source is connected to the charge detector $D(i,j)$.

Sequentially addressing the rows $L(i)$ requires providing two separate voltages: one voltage Voff for keeping all of the transistors $T(i,j)$ of a row in the off state and one voltage Von for putting all of the transistors $T(i,j)$ of a row into the on state. The transistors $T(i,j)$ are addressed by a selection token. The selection token is a high-level signal (voltage Von) for a predetermined time, in comparison with a low level (voltage Voff lower than Von), that propagates from row to row, in a given direction, for example from the row $L(i)$ to the row $L(i+1)$.

At the time when the selection token propagates in a row $L(i)$, the high level of the token commands the on state of all of the transistors of the row. The high level of the selection token is configured so as to have a value greater than the threshold voltage of the transistors. The electrons stored in each of the charge detectors $D(i,j)$ of the row are transmitted to a charge integrator via a column $Col(j)$ associated with the charge detector $D(i,j)$, which converts this value into a voltage. The column $Col(j)$ is connected to the drain of the transistor $T(i,j)$. The integration of the charge in each column may be managed by an integrated circuit common to all of the columns, also called readout integrated circuit or ROIC. This converts the measured value into digital so that the image of the fingerprint is able to be generated, row by row.

The propagation of the selection token from row to row is managed by a row-addressing device or row scanner, commonly called "row driver" or "gate driver". The row control circuit is a shift register. Patent EP0586398B1 describes an example of a shift register used in liquid-crystal displays. Although the present application is applied to detection arrays and not to display arrays, the principle is identical. With reference to FIG. 2, each stage ET comprises an input terminal Bini (i=0 . . . 3) and an output terminal Bouti (i=0 . . . 3) that is itself connected to a respective row of the array. A signal generator GSI, which may be integrated into the readout integrated circuit, generates two clock signals CK1, CK2 in phase opposition to one another. Each stage ETi (i=0 . . . 3) comprises a first clock terminal Bck1-$i$ (i=0 . . . 3) able to receive the first clock signal CK1 and a second clock terminal Bck2-$i$ (i=0 . . . 3) able to receive the second clock signal CK2. A pulse STVext (called "token") is received by the input terminal Bin0 of the first stage ET0, and, at the first clock pulse, for example of the first clock signal CK1, the token is transmitted to the row $L(0)$ by the output terminal Bout0, so as to read the information stored in the detection cells of the corresponding row, as indicated above.

The input terminal Bin1 of the second stage ET1 is connected to the output terminal Bout0 of the first stage ET0. A second clock signal CK2 is received by the second stage ET1 at the second clock terminal Bck2-1. The token is thus transmitted to the second row $L(1)$. The first clock signal CK1 and the second clock signal CK2 are phase-offset from one another such that there is no dead time in the reading of the array.

The token thus propagates from stage to stage until all of the rows of the array have been read.

Other clock systems, different from two clock signals in phase opposition, may be contemplated without departing from the scope of the invention. For example, shift registers using more than two clock signals may be contemplated, or even shift registers using a single clock signal.

Row-addressing devices were initially arranged outside of the array, connected to the array for example by flexible layers. Row-addressing devices implemented directly in the array, using single N-type or P-type TFT transistors, have appeared more recently. The array may be formed by depositing layers on a substrate, for example of amorphous silicon (a-Si), TFT, polycrystalline silicon, organic semiconductor or amorphous gallium indium zinc oxide ($Ga_2O_3$-$In_2O_3$-ZnO) type.

These addressing devices integrated into the array, commonly called GOA (gate driver on array), make it possible to save on manufacturing costs and footprint, and make it possible to limit connection errors in comparison with external addressing devices. One example of a GOA is described in patent application FR2975213.

However, GOAs used at present have a greatly limited speed in terms of moving from one stage to another, which is linked to TFT technologies. Specifically, moving from one stage to another in the shift register requires between ten and twenty microseconds, whereas this delay is only one hundred nanoseconds using CMOS technology, which is the technology generally used for external addressing devices.

For a fingerprint recognition application on a touchscreen of a smartphone or any other equivalent device, the number of rows of the array is approximately equal to two thousand, this number obviously being able to vary from one device to another. Thus, if the finger is placed at the bottom of the screen, it would take approximately forty milliseconds for the selection token to propagate in all of the stages of the shift register. The execution time for the fingerprint recognition method may also be multiplied by as many reread operations that are necessary to consolidate the data, generally between three and six. The time necessary to compare the fingerprint with the one that is authorized further adds to these delays.

The fingerprint recognition method thus has to be executed quickly, in particular in less than two hundred milliseconds, a delay beyond which it has been established empirically that the user detects a latency time, and therefore a feeling of waiting.

SUMMARY OF THE INVENTION

The invention therefore aims to provide a GOA row-addressing device that makes it possible to start scanning rows at the desired location of the array, while adding the fewest possible new control signals.

One subject of the invention is therefore a fingerprint acquisition system, comprising a touch surface configured so as to provide location information for at least one contact point of a finger having a fingerprint in contact with the touch surface, characterized in that the system comprises:
a TFT panel, arranged underneath the touch surface, comprising a detection array comprising M rows at least some of which comprise detection cells for detecting an image representative of the fingerprint, a row-addressing system being integrated into the array, and configured so as to activate, row after row, the detection cells of a corresponding row in a scanning direction of the rows,
a calculation device, configured so as to receive the location information and so as to command the addressing system to address the array starting from an address range grouping together a subset of rows from among the M rows of the array, and determined on the basis of the location information.

Advantageously, the addressing system comprises a shift register comprising M stages, each of the M stages having an output connected to a corresponding row input, and an additional shift register, comprising N stages, called additional stages, where N<M, the additional shift register being connected to the row inputs by way of the shift register, each additional stage being connected to the first stage of a group of stages of the shift register.

Advantageously, the calculation device is configured so as to determine a row, called initial row, corresponding to the start of the address range, in the scanning direction of the rows, and so as to determine an additional stage, called initial additional stage, the initial additional stage being able to activate the detection cells of the initial row.

Advantageously, the system comprises a signal generator configured so as to provide the shift register and the additional shift register with a first clock signal and a second clock signal in phase opposition to one another.

Advantageously, each additional stage comprises:
an input terminal, configured so as to receive a high-level signal, called token,
a first transistor whose gate is connected directly or indirectly to the input terminal, and whose drain is configured so as to receive a clock signal from among the first clock signal or the second clock signal,
an intermediate node connected to the source of the first transistor, the intermediate node being connected to the input terminal of the following additional stage,
an inhibition circuit for the stage connected to the additional stage, controlled by a first inhibition signal provided by the signal generator, the inhibition circuit being configured such that the token is transmitted to the following additional stage at each clock pulse for as long as the first inhibition signal is at a low level, and that the token is transmitted to the stage connected to the additional stage when the first inhibition signal is at a high level.

Advantageously, the signal generator is configured such that the first inhibition signal has a high level when the input terminal of the initial additional stage determined by the calculation device receives the token.

Advantageously, the inhibition circuit comprises:
a second transistor whose gate is connected directly or indirectly to the intermediate node and whose drain is able to receive the inhibition signal,
an output terminal connected to the source of the second transistor and to a stage of the shift register.

Advantageously, the signal generator is configured so as to provide the inhibition circuit with a second inhibition signal, the second inhibition signal having a high level immediately after the first inhibition signal changes to the low level, and wherein the output terminal is connected to the drain of a third transistor whose gate is able to receive the second inhibition signal.

Advantageously, the additional stages of the additional shift register are connected to the stages of the shift register with regular spacing between the stages of the shift register.

Advantageously, each additional stage is connected to a stage by way of a diode-connected transistor.

BRIEF DESCRIPTION OF THE DRAWINGS

The appended drawings illustrate the invention.

DETAILED DESCRIPTION

Figure 1:
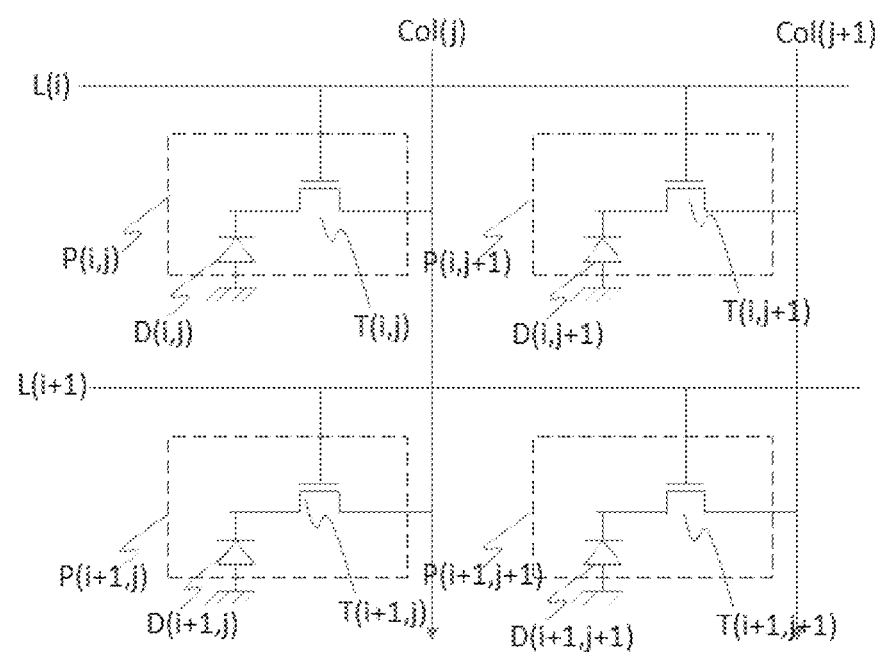
FIG. 1, already described, shows the arrangement of detection cells in rows and in columns according to the prior art.
Figure 2:
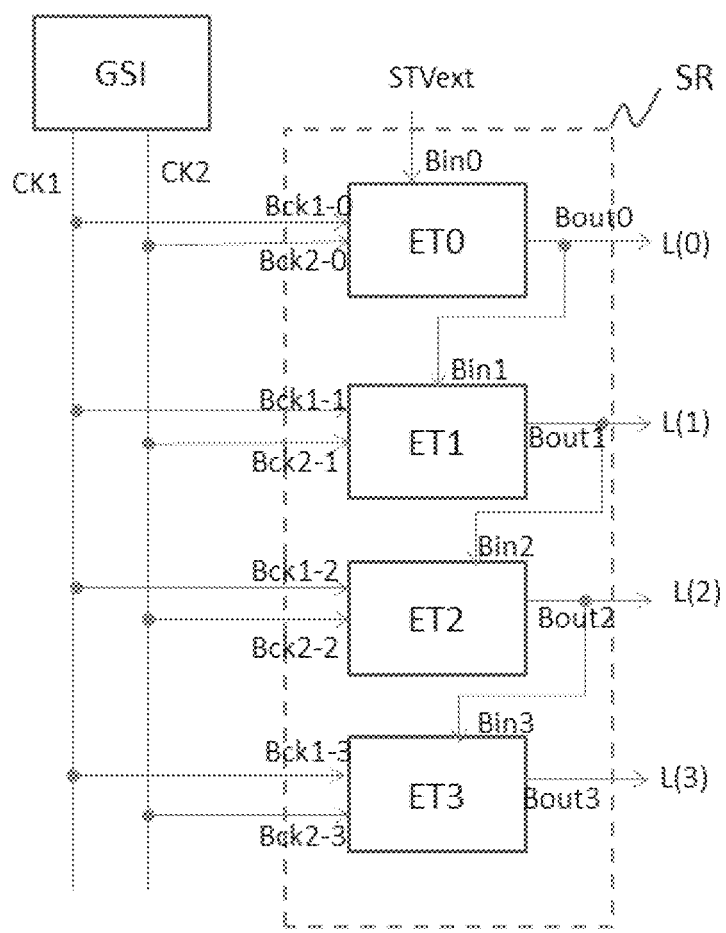
FIG. 2, already described, schematically shows a shift register according to the prior art.
Figure 3:
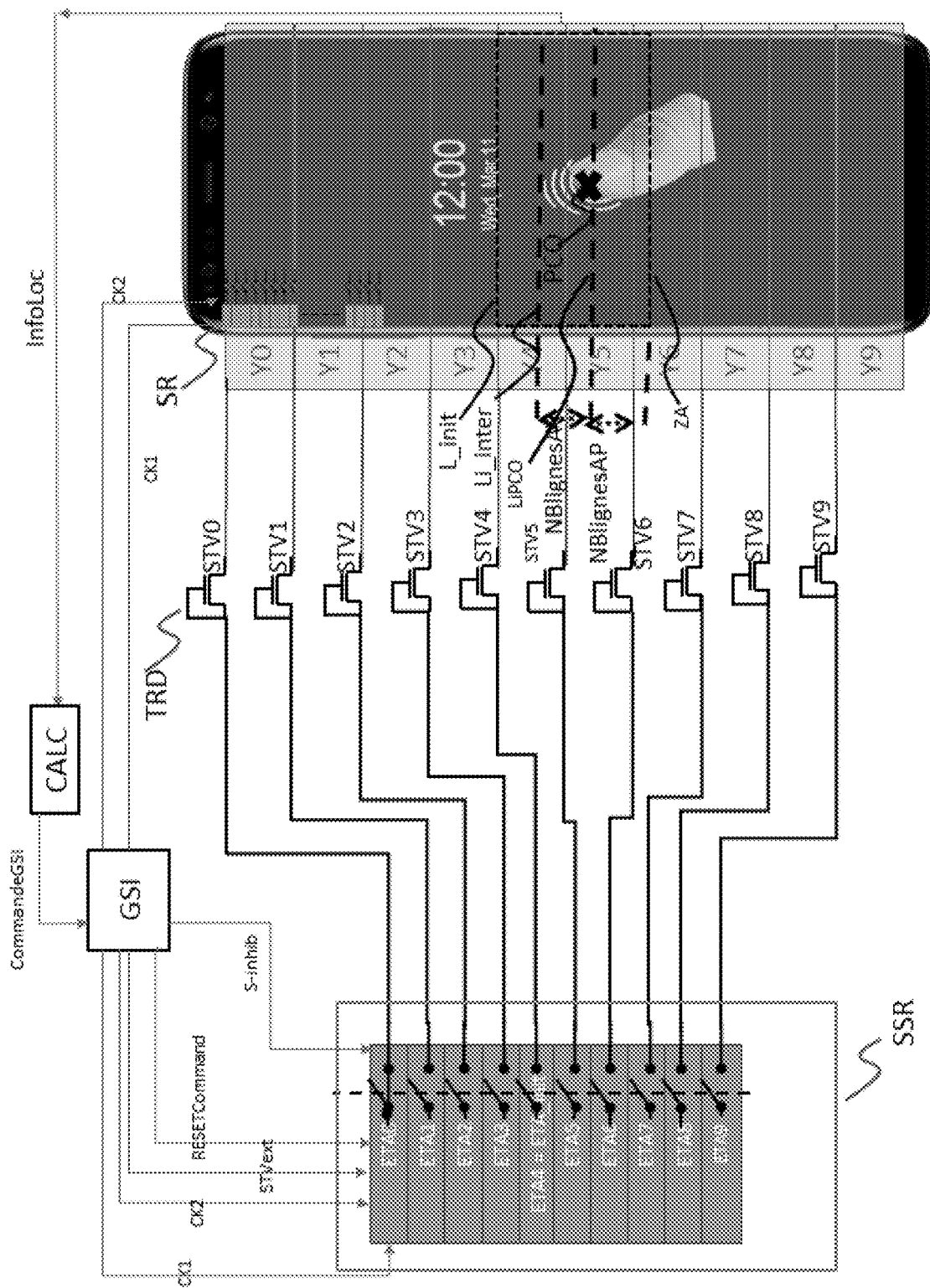
FIG. 3 schematically shows the fingerprint acquisition system according to the invention.

FIG. 3 schematically shows the fingerprint acquisition system according to the invention. The fingerprint recognition is performed on an apparatus, represented in FIG. 3 by a smartphone-type telephone, for example in order to unlock the telephone, or else to secure the use of an application, such as payment. The invention is not limited to fingerprint recognition on a telephone, and may be implemented on any type of electronic apparatus.

The acquisition system comprises a touch surface, not shown. The electronic apparatus may also incorporate a display function in combination with the touch surface, the assembly of which then forms a touchscreen.

When the user's finger comes into contact on the surface of the apparatus, a calculation device CALC, arranged in the electronic apparatus, detects the contact point PCO of the finger on the touch surface. The detection may be performed in various ways, for example using resistive or capacitive technologies. In any case, the contact point PCO corresponds to coordinates of a point in the plane of the touch surface. In the event of extended contact, giving rise to several effective contact points, the calculation device CALC may consider that the contact point to be used for the remainder of the processing corresponds to one of the effective contact points (for example the upper point or the lower point), or to a notional contact point whose coordinates correspond to the average of the coordinates of the effective contact points.

A detection array as described above is arranged underneath the touch surface and is integrated into a TFT panel.

The detection array comprises M rows. At least some of the rows comprise detection cells. All of the rows are driven by an addressing device integrated into the array. The addressing device comprises a shift register SR comprising M stages. Each stage is connected to a row of the array. Such a stage is illustrated for example in FIG. 3 of document FR2975213.

The system according to the invention and illustrated in FIG. 3 allows the shift register SR to transmit the token in the array, with the clock signals CK1 and CK2 that are normally used, from a predetermined row of the array, corresponding to the zone in which the fingerprint should be detected. A time saving is thus obtained by avoiding propagation of the activation signal in certain shift registers SR.

To this end, the system according to the invention uses an additional shift register SSR, also integrated into the array. The additional shift register SSR comprises N additional stages ETA, where N<M. Advantageously, the ratio M/N may be equal to 20. Thus, for an array of two thousand rows, and therefore a shift register of two thousand stages, the additional shift register SSR may comprise one hundred additional stages. In one particularly advantageous embodiment of the invention, the ratio M/N may be equal to 200. Thus, for an array of two thousand rows, and therefore a shift register of two thousand stages, the additional shift register SSR may comprise ten additional stages. The footprint of the additional shift register SSR is therefore low; it may be situated for example in a corner of the array. It may in particular be situated close to the input/output pads.

Advantageously, the additional stages ETA of the additional shift register SSR are connected to the stages ET of the shift register SR with regular spacing between the stages ET of the shift register SR. Each additional stage ETA thus groups together the same number of stages ET, thereby making it easier to implement the additional shift register. In the abovementioned example, the spacing corresponds to the ratio M/N (200).

As a variant, the spacing between the stages may be irregular; for example, the additional stages ETA may group together fewer stages ET at the centre of the detector in comparison with the upper and lower parts.

The calculation device CALC may be a dedicated circuit, for example an ASIC (for "application-specific integrated circuit") or FPGA (for "field-programmable gate array") circuit, or an appropriately programmed processor. In the last case, the calculation device may be a central processor that also performs other functions. The calculation device CALC receives location information InfoLoc from the touch surface in the form of coordinates of a point in the plane of the touch surface. An address range ZA where the fingerprint of the user is to be analysed is defined by the calculation device CALC based on the location information InfoLoc. Specifically, the maximum dimensions of the surface occupied by a finger during a fingerprint recognition procedure are known in the field of fingerprint sensors.

Typically, for a detector having a resolution of 500 dpi (for "dots per inch"), with the knowledge that a thumbprint may be measured, along the dimension corresponding to the length of the finger, over approximately fifteen millimetres, it is enough to acquire the image of the fingerprint over three hundred rows.

The calculation device CALC thus determines which row of the array corresponds to the contact point PCO, and determines one hundred and fifty rows situated before in the scanning direction of the rows of the array and one hundred and fifty rows situated after in the scanning direction of the rows.

Determining the row of the array corresponding to the contact point PCO of the touch surface may use what is called an alignment procedure, linked to the fact that the resolution of the array Res1 (spacing between two consecutive pixels) and the resolution of the touch surface Res2 (spacing between two consecutive detection elements) may be different.

A press of the finger in the xy plane of the touch surface is located at (x*Res2) on the abscissa axis and (y*Res2) on the ordinate axis, taking (0,0) to be a corner of the touch surface, for example the upper left corner of the touch surface.

The corresponding point on the TFT array, with respect to the pixel (0,0) in the corner (for example upper left corner), is located at:

$$x\text{TFT}=(x*\text{Res2})/\text{Res1}+\text{delta}X/\text{Res1}$$

$$\text{and } y\text{TFT}=(y*\text{Res2})/\text{Res1}+\text{delta}Y/\text{Res1}$$

where DeltaX and DeltaY are the shifts of the (0,0) of the TFT array with respect to the (0,0) of the touch surface, measured in the factory.

The row of the array LiPCO corresponding to the contact point PCO is therefore deduced from the relationship between "yTFT" and "y".

Of course, the calculation device CALC may define an address range with a different number of rows before and after the contact point PCO, for example two hundred before and two hundred after the contact point PCO.

NBlignesAV is defined as the number of rows needing to be taken into account before the contact point PCO, and NBlignesAP is defined as the number of rows needing to be taken into account after the contact point PCO, in order to take into account the normal dimensions of a fingerprint.

For example, NBlignesAV=NBlignesAP=150.

The name intermediate row Li_inter is given to the row such that: #Ligne_inter=#LiPCO−NBlignesAV, where #Ligne_inter denotes the number of the intermediate row, and #LiPCO denotes the number of the row of the array LiPCO corresponding to the contact point PCO.

By convention, initial row L_init is the name given to the row connected (via the stage ET of the shift register SR) to an additional stage ETA of the group of rows comprising the intermediate row Li_inter in the scanning direction of the rows of the array.

By convention, "initial additional stage (ETA_init)" is the name given to the additional stage that is able to activate the detection cells (P(i,j)) of the initial row (L_init). Each additional stage ETA is connected the first group of stages ET of the shift register SR. In the abovementioned example, each additional stage ETA groups together two hundred stages ET, and therefore two hundred rows, and the initial additional stage corresponds to the fifth additional stage, considering that the first additional stage is the one that receives the initial pulse STVext. In FIG. 3, blocks Y0-Y9 illustrate the grouping together of the various rows.

The system according to the invention makes it possible to address a subset of rows from among the M rows of the array. The subset comprises at least the address range ZA, which is determined on the basis of the location information InfoLoc.

The calculation device CALC commands a signal generator GSI such that said signal generator generates the number of requested clock signals. The calculation device CALC communicates with the signal generator GSI by transmitting command signals "CommandeGSI". The signal generator GSI may comprise a dedicated circuit, for example an FPGA circuit, coupled to a level converter. The FPGA receives the command signals CommandeGSI transmitted by the calculation device CALC. The FPGA generates the logic signals at a low voltage (for example between 0 and 3.3 V). The level converter ensures that the low voltages of the FPGA and the higher voltages of the array (Von, Voff) are compatible.

For each new read operation on the array, the calculation device CALC commands the signal generator GSI to generate a new pulse STVext. The calculation device CALC determines how many rising edges of the first clock signal CK1 and of the second clock signal CK2 have to be generated starting from the time at which the pulse STVext is generated.

The calculation device determines the number of rising edges on the basis of the position of the first row of the address range ZA, and more particularly of the first stage ET of the group of stages ET in which the first row of the address range ZA is located.

The signal generator GSI generates a signal S-inhib, called first inhibition signal. The first inhibition signal S-inhib has a high level only when the clock signal to which the initial additional stage ETAinit is connected has a high level at the time when the token propagates in the initial additional stage ETAinit. This condition is verified by the calculation device CALC. The first inhibition signal S-inhib then changes back to the low level at the falling edge of the clock signal.

In the example illustrated by FIG. 3, the address range ZA starts at row 800, which is connected to one of the additional stages of the additional shift register SSR, in this case the fifth one (ETA4). The array is addressed starting from row 800. The calculation device CALC therefore considers that the fifth additional stage ETA4 is the initial additional stage ETAinit. Assuming that the first additional stage ETA0 is activated by the first clock pulse CK1, the second additional stage ETA1 will be activated by the second clock pulse CK2, and so on. The fifth additional stage ETA4 is activated by the first clock pulse CK1, which corresponds to the fifth rising edge CK1/CK2. The calculation device CALC then delivers the first inhibition signal S-inhib to the additional shift register.

The signal generator GSI then generates a second inhibition signal RESETcommand, which has a high level immediately after the first inhibition signal S-inhib changes to the low level. The second inhibition signal RESETcommand makes it possible to inhibit the propagation of the token in the additional shift register. It thus propagates only in the shift register, starting from the stage connected to the initial additional stage ETAinit.

Each additional stage receives the first clock signal CK1, the second signal CK2, the first inhibition signal S-inhib and the second inhibition signal RESETcommand. The initial pulse STVext is transmitted only to the first additional stage ETA0.

Advantageously, each additional stage ETA is connected to a stage ET by way of a diode-connected transistor TRD, that is to say whose gate is connected to its drain. Thus, when the second inhibition signal RESETcommand is applied, the diode-connected transistor TRD makes it possible to channel the token in the shift register SR while at the same time isolating the initial additional stage ETA_init that transmitted the token. Specifically, the diode-connected transistor TRD channels only the positive voltages Von; when the initial additional stage ETA_init is reset to Voff, the row of the shift register SR that receives the token keeps its state at Von.

In FIG. 3, some elements forming the invention are shown outside of the electronic apparatus on which the fingerprint is to be recognized. This depiction is schematic; in particular, the additional shift register SSR is integrated into the GOA; the calculation device CALC and the signal generator GSI may be arranged in circuits connected to the GOA.

Figure 4:
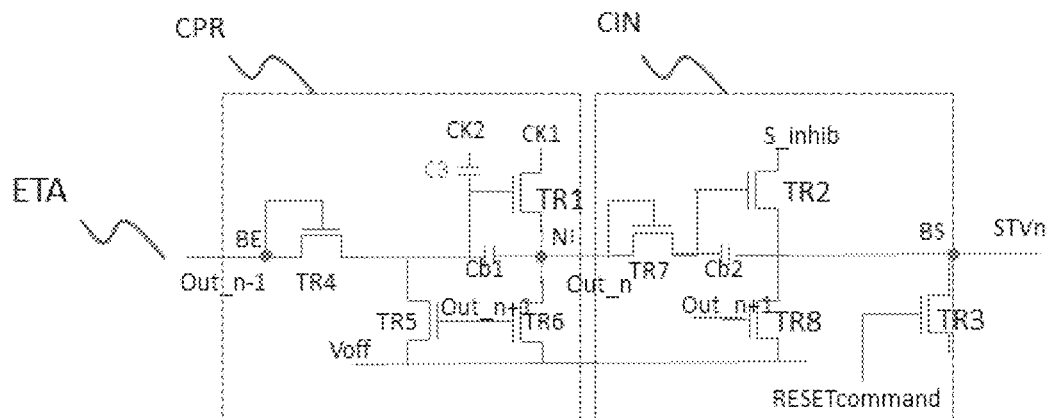
FIG. 4 shows a circuit diagram of the additional shift register according to the invention.

The circuit diagram of each additional stage ETA of the additional shift register is shown in FIG. 4.

The additional stage is broken down into a propagation circuit CPR and an inhibition circuit CIN. The propagation circuit CPR has a structure similar to the stage illustrated in FIG. 3 of document FR2975213, and operates in a similar manner.

The output signal Out_n represents the output of the propagation circuit CPR of the additional stage ETA of level n. The propagation circuit CPR receives an input signal Out_n−1 at input and provides an output signal Out_n.

In the field of row-addressing devices, the pulse of the input signal is commonly called token, and is received at an input terminal BE. In the system according to the invention, the token propagates from additional stage to additional stage, as far as the initial additional stage ETA_init, where the token may then propagate in the array, starting from the register connected to the initial additional stage ETA_init. The token is transmitted by the output signal of the preceding additional stage. For the first additional stage, the token may be generated by the signal generator GSI (signal STVext).

A first transistor TR1 transmits a pulse of the clock signal CK1 (or CK2 for the odd-numbered additional stages) when it is in the on state. Its drain is thus connected to the signal generator GSI. A boost capacitor Cb1 is connected between the gate and the source of the first transistor TR1. Such a capacitor is responsible for the "bootstrap" effect that makes it possible to channel the drain/source voltage at 2×Von when the first transistor TR1 changes from weakly on to fully on.

A pre-charging transistor TR4 makes it possible to pre-charge the gate of the first transistor TR1. The source of the pre-charging transistor TR4 is thus connected to the gate of the first transistor TR1. A control transistor TR5 makes it possible to discharge the gate of the first transistor TR1. The drain of the control transistor TR5 is thus connected to the gate of the first transistor TR1. The control transistor TR5 is commanded by the output signal Out_n+1 of the following additional stage, of level n+1. The gate of the control transistor TR5 is thus connected to the output signal Out_n+1 of the following additional stage, of level n+1. The gate of the control transistor TR5 of the last additional stage may be commanded by a specific signal. In particular, the specific signal may be the second inhibition signal RESETcommand. The source of the control transistor TR5 is then biased to the voltage Voff.

A discharging transistor TR6 may be connected to the output Out_n of the additional stage of level n. It makes it easier to discharge the output Out_n when the token has been transmitted to the row. The gate of the discharging transistor TR6 is connected to the gate of the control transistor TR5. It is however not essential for the discharging transistor TR6 to be present, due to the relatively low number of additional stages (of the order of around ten). Specifically, the discharging transistor TR6 resets the voltage at the source of the first transistor TR1 to zero in order to prevent the occurrence of unwanted tokens. However, with a very low number of additional stages, the occurrence of unwanted tokens is unlikely.

A compensation capacitor C3 may be arranged between the second clock signal CK2 and the source of the pre-charging transistor TR4. It makes it possible to compensate the effects of the stray capacitance between the gate and the drain of the first transistor TR1 during switching of the first clock signal CK1 applied to the drain of the first transistor TR1. It is however not essential for it to be present, due to the relatively low number of additional stages (of the order of around ten), and the build-up of stray interference is thus far less disruptive than in the conventional stages of shift registers. Specifically, in a shift register comprising of the order of one thousand stages, without the compensation capacitor, the stray interference would be multiplied at the end of the array by this many stages, and this would be unacceptable.

An intermediate node NI is arranged at the output of the propagation circuit CPR. The output signal Out_n may be drawn at the intermediate node NI. The intermediate node NI is connected to the input terminal of the following additional stage.

An inhibition circuit CIN of the stage ET connected to the additional stage ETA allows the additional stage either to inhibit the stage ET connected to the additional stage ETA, and thus to transmit the token either to the following additional stage, or to transmit the token to the array such that the cells are addressed. For this purpose, the inhibition circuit CIN receives the output signal Out_n and a first inhibition signal S-inhib provided by the calculation device CALC. The calculation device CALC transmits the pulse of the inhibition signal S-inhib when the token is located in the initial additional stage ETA_init. The calculation device CALC commands the generation of the clock signals CK1 and CK2, as illustrated by FIG. 3. It is therefore able to determine the time at which a rising edge should be generated in the inhibition signal S-inhib.

The inhibition circuit CIN comprises a second transistor TR2 whose gate is connected to the intermediate node NI and whose drain is able to receive the inhibition signal S-inhib. Advantageously, a diode-connected pre-charging transistor TR7 is arranged between the intermediate node and the gate of the second transistor TR2. The pre-charging transistor TR7 makes it possible to pre-charge the gate of the second transistor TR2.

An output terminal BS is connected to the source of the second transistor TR2 and to the corresponding stage ET of the shift register SR. When the token, transmitted by the intermediate node NI, is transmitted to the output terminal, a rising edge of a validation signal STVn is generated at the output terminal BS.

Advantageously, a second boost capacitor Cb2 is connected between the gate and the source of the second transistor TR2. Such a capacitor is responsible for the "bootstrap" effect that makes it possible to channel the drain/source voltage at 2×Von when the second transistor TR2 changes from weakly on to fully on.

A second discharging transistor TR8 may be connected to the output terminal BS of the additional stage of level n. It makes it easier to discharge the second transistor TR2. It is commanded by the output signal of the following additional stage Out_n+1. The gate of the discharging transistor TR8 of the last additional stage may be commanded by the second inhibition signal RESETcommand.

The inhibition circuit CIN moreover comprises a third transistor TR3. The third transistor TR3 is commanded by the second inhibition signal RESETcommand, provided by the signal generator GSI. The second inhibition signal RESETcommand has a high level immediately after the first inhibition signal S-inhib changes to the low level. The output terminal BS is connected to the drain of the third transistor TR3. The second inhibition signal RESETcommand thus keeps the validation signals STVn at Voff once the validation signal of the initial additional stage ETA_init has been transmitted to the stage of the shift register SR to which the initial additional stage ETA_init is connected, doing so throughout the read time of the array.

Figure 5:
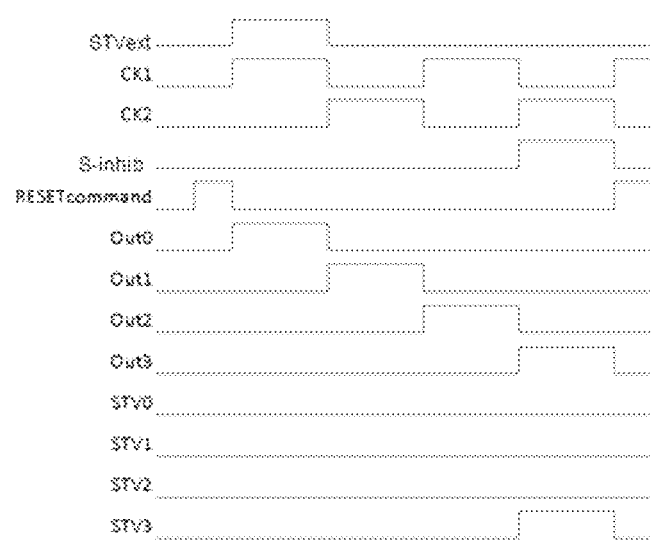
FIG. 5 shows a timing diagram illustrating the operation of the row-addressing device according to the invention.

FIG. 5 shows a timing diagram illustrating the operation of the row-addressing device according to the invention. In the diagram illustrated by FIG. 5, it may be considered that the calculation device CALC has detected, by way of the location information InfoLoc transmitted by the touch surface, that the fourth additional register may send the activation signal STV3. This may correspond for example to an address range starting between rows 600 and 800, for a two thousand-row array, with twenty stages of the shift register SR attached to each additional stage of the additional shift register SSR.

A pulse STVext is provided at the input terminal BE of the first additional stage ETA0. At the same time, the first clock signal CK1 has a high level (voltage at Von); thus, the output signal Out0 has a high level. As the first inhibition signal S-inhib is at the low level (voltage at Voff), the token is transmitted to the second additional stage ETA1. The second clock signal CK2 has a high level; thus, the output signal Out1 has a high level. As the first inhibition signal S-inhib is still at the low level, the token is transmitted to the third additional stage ETA2. The first clock signal CK1 has a high level; thus, the output signal Out2 has a high level. As the first inhibition signal S-inhib is still at the low level, the token is transmitted to the fourth additional stage ETA3.

The calculation device has identified the fourth additional stage ETA3 as being the initial additional stage ETA_init. Thus, the first inhibition signal S-inhib has a high level at the time when the token propagates in the fourth additional stage ETA3. The output Out3 has a high level, and since the first inhibition signal S-inhib also has a high level, the activation signal STV3 changes to Von. The token may then be transmitted to the stage ET of the shift register SR connected to the fourth additional stage ETA3. The array may be addressed starting from the row associated with this stage. Thus, in this example, in four clock pulses, the array is addressed starting from row 600. The clock signals are moreover those used for the shift register, and there is therefore no need to provide additional clock generators.

As soon as the first inhibition signal S-inhib has returned to the low level, the calculation device CALC sets the second inhibition signal RESETcommand to the voltage Von. The third transistor TR3 thus switches to the on state, and the following additional stages are inhibited until the last read operation on the array.

In one embodiment, the array may be addressed as far as the last row of the array. The calculation device CALC has the information relating to the total number of rows of the array; thus, when the last row of the array is reached, the calculation device CALC commands the signal generator GSI to stop transmitting the clock signals to the shift register SR.

As an alternative, the calculation device CALC may command stopping of the reading of the array based on the location information InfoLoc. Specifically, based on the location information InfoLoc, the calculation device CALC is able to determine the last row of the address range ZA. The calculation device CALC commands the signal generator GSI to stop sending clock signals to the shift register SR when the last row of the address range ZA is reached.

Returning to the example illustrated by FIG. 3, if for example the row at the end of the address range ZA corresponds to row number 1240, the calculation device CALC commands the signal generator GSI to generate five clock pulses so that the token propagates in the additional shift register SSR, and then four hundred clock pulses so that the token propagates in groups Y4 and Y5, and lastly forty clock pulses so that the token propagates in rows number 1200 to 1240. The calculation device CALC thus commands the signal generator GSI to stop generating clock signals after 445 clock pulses.

The system according to the invention is particularly well suited to detectors having large arrays comprising several thousand rows.

The system according to the invention makes it possible to have a windowing function, which is a function specific to detectors. This function is specifically not required in TFT panel displays.

This function is added for a cost of virtually nothing, specifically by adding only two commands, and a small additional shift register able to be adapted depending on the intended application, to gate drivers integrated into a TFT panel. It is possible to achieve a significant time saving when addressing the array with an additional shift register comprising only ten additional stages.

Moreover, due to the small size of the additional shift register, the area of the array increases slightly, or even not at all, if the additional shift register is able to be integrated at a location of the array that is left free. Now, in a white room in which the array is manufactured, the number of faults is proportional to the size of the array as the number of dust particles able to generate a fault is proportional to the size of the array. The efficiency of the array decreases as the size of the array increases. The system according to the invention therefore barely affects the efficiency of the array, if at all.

The invention claimed is:

1. A fingerprint acquisition system, comprising a touch surface configured so as to provide location information (InfoLoc) for at least one contact point (PCO) of a finger having a fingerprint in contact with the touch surface, the system comprising:
    a TFT panel, arranged underneath the touch surface, comprising a detection array comprising M rows at least some of which comprise detection cells (P(i,j)) for detecting an image representative of the fingerprint, a row-addressing system being integrated into the array, and configured so as to activate, row after row, the detection cells (P(i,j)) of a corresponding row in a scanning direction of the rows,
    a calculation device (CALC), configured so as to receive the location information (InfoLoc) and so as to command the addressing system to address the array starting from an address range (ZA) grouping together a subset of rows from among the M rows of the array, and determined on the basis of the location information (InfoLoc),
    wherein the addressing system comprises a shift register (SR) comprising M stages (ET), each of the M stages (ET) having an output connected to a corresponding row input, and an additional shift register (SSR), comprising N stages, being additional stages (ETA), where N<M, the additional shift register (SSR) being connected to the row inputs by way of the shift register (SR), each additional stage (ETA) being connected to the first stage (ET) of a group of stages (ET) of the shift register (SR),
    wherein the calculation device (CALC) is configured so as to determine a row, being an initial row (L_init), corresponding to the start of the address range (ZA), in the scanning direction of the rows, and so as to determine an additional stage, being an initial additional stage (ETA_init), the initial additional stage (ETA_init) being able to activate the detection cells (P(ij)) of the initial row (L_init).

2. The system according to claim 1, comprising a signal generator (GSI) configured so as to provide the shift register (SR) and the additional shift register (SSR) with a first clock signal (CK1) and a second clock signal (CK2) in phase opposition to one another.

3. The system according to claim 2, wherein each additional stage (ETA) comprises:
    an input terminal (BE), configured so as to receive a high-level signal, being a token,
    a first transistor (TR1) whose gate is connected directly or indirectly to the input terminal (BE), and whose drain is configured so as to receive a clock signal from among the first clock signal (CK1) or the second clock signal (CK2),
    an intermediate node (NI) connected to the source of the first transistor (TR1), the intermediate node (NI) being connected to the input terminal of the following additional stage,
    an inhibition circuit (CIN) for the stage (ET) connected to the additional stage (ETA), controlled by a first inhibition signal (S-inhib) provided by the signal generator (GSI), the inhibition circuit (CIN) being configured such that the token is transmitted to the following additional stage at each clock pulse (CK1, CK2) for as long as the first inhibition signal (S-inhib) is at a low level, and that the token is transmitted to the stage (ET) connected to the additional stage (ETA) when the first inhibition signal is at a high level.

4. The system according to claim 3, wherein the signal generator (GSI) is configured such that the first inhibition signal (S-inhib) has a high level when the input terminal (BE) of the initial additional stage (ETA_init) determined by the calculation device (CALC) receives the token.

5. The system according to claim 3, wherein the inhibition circuit (CIN) comprises:
    a second transistor (TR2) whose gate is connected directly or indirectly to the intermediate node (NI) and whose drain is able to receive the inhibition signal (S-inhib),
    an output terminal (BS) connected to the source of the second transistor (TR2) and to a stage (ET) of the shift register (SR).

6. The system according to claim 5, wherein the signal generator (GSI) is configured so as to provide the inhibition circuit (CIN) with a second inhibition signal (RESETcommand), the second inhibition signal (RESETcommand) having a high level immediately after the first inhibition signal (S-inhib) changes to the low level, and wherein the output terminal (BS) is connected to the drain of a third transistor (TR3) whose gate is able to receive the second inhibition signal (RESETcommand).

7. The system according to claim 1, wherein the additional stages (ETA) of the additional shift register (SSR) are connected to the stages (ET) of the shift register (SR) with regular spacing between the stages (ET) of the shift register (SR).

8. The system according to claim 1, wherein each additional stage (ETA) is connected to a stage (ET) by way of a diode-connected transistor (TRD).

* * * * *